G. P. REED.
Clock Escapement.
No. 31,999.
Patented April 9, 1861.
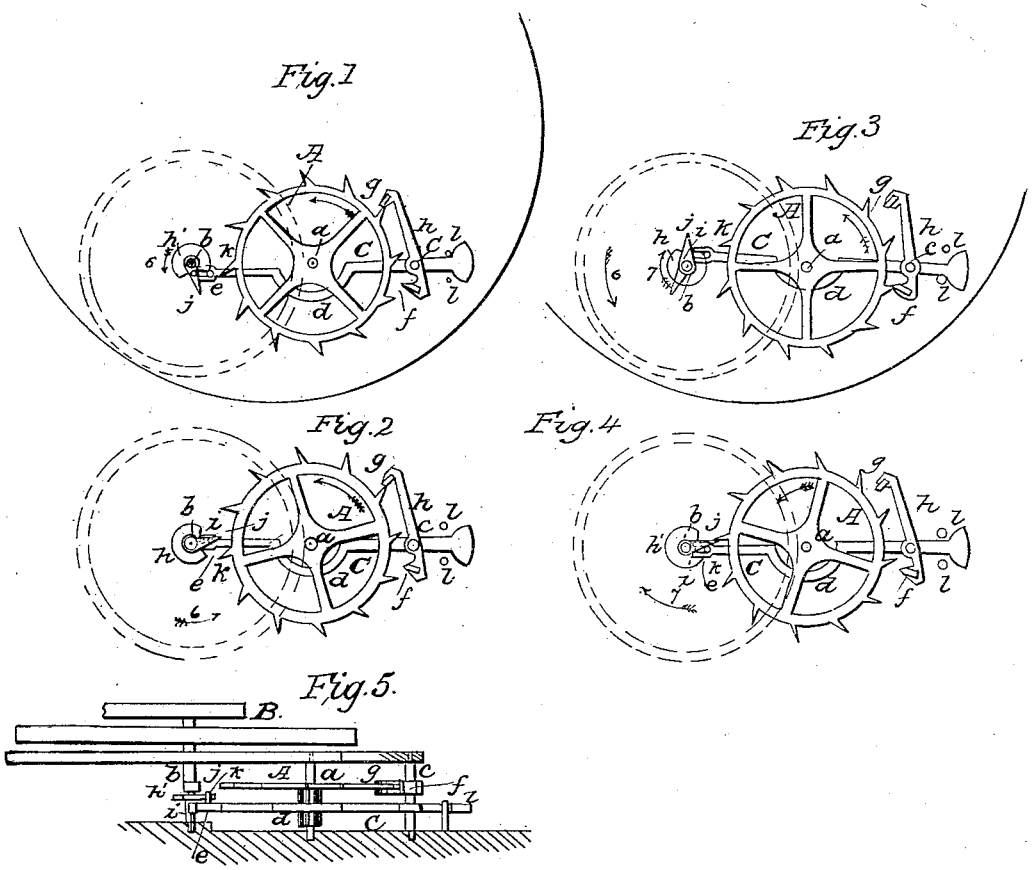
Witnesses
Inventor
G P Reed
per Munn & Co
attorneys

UNITED STATES PATENT OFFICE.

GEORGE P. REED, OF ROXBURY, MASSACHUSETTS.

WATCH-ESCAPEMENT.

Specification of Letters Patent No. 31,999, dated April 9, 1861.

*To all whom it may concern:*

Be it known that I, GEORGE P. REED, of Roxbury, in the county of Norfolk and State of Massachusetts, have invented a new and Improved Escapement for Watches; and I do hereby declare the following is a full, clear, and exact description of the same, reference being had to the accompanying drawings, forming part of this specification, in which—

Figures 1, 2, 3 and 4 are plans of my escapement, showing it in different positions. Fig. 5 is a side view of the same.

Similar letters of reference indicate corresponding parts in the several figures.

It has been long acknowledged by experienced watch-makers that of the many kinds of escapements that have been tried, two, viz: that known as the "lever" escapement, and that known as the "chronometer" escapement, excel all others in durability, strength, ease of action, and general excellence of performance; nevertheless there are some slight objections to both of these as usually applied, each being in some respects inferior, though in some superior, to the other, as for instance the chronometer escapement is superior to the lever inasmuch as it gives the impulse to the balance more directly, it acts with less friction, and imparts more power, but is inferior inasmuch as it gives the impulse only in one direction, is liable to "overbank", and is more expensive to make.

My invention consists in a certain novel construction of the escapement, whereby I have combined the advantages of both the lever and chronometer escapements without the disadvantages of either.

To enable those skilled in the art to make and use my invention I will proceed to describe its construction and operation.

A is the scape wheel constructed like that of the lever escapement, and $a$, is its spindle.

B is the balance and $b$, its staff, the latter arranged parallel with the scape wheel spindle, just outside the circumference of the scape wheel.

$c$, is the staff of the lever, arranged on the opposite side of the scape wheel to that on which the balance staff is arranged.

C is the lever having a crook at $d$, where it passes the scape wheel spindle to enable it to make its proper vibration. This crook in the lever may be dispensed with and the lever made straight by arranging the lever staff $c$, out of the plane in which the scape wheel spindle and balance staff are situated.

$f$, $g$, are the pallets attached to an anchor-like cross-piece $h$, which is arranged transversely to the length of the principal portion of the lever. The pallet $f$, is a detent pallet, its office being simply to detain the wheel in proper position; this I term the "chronometer detent pallet." The pallet $g$, is both a detent and an impulse pallet; this I term the "lever impulse pallet."

$h'$, is the roller on the balance staff, and $i$, the pin in the said roller to which the impulse given to the pallet $g$, is transmitted by the lever.

$j$, is an impulse pallet on the balance staff, which I will term the "chronometer pallet."

$k$, is the guard pin on the lever; and $l$, $l$, are the banking pins.

The operation of the escapement in a complete vibration of the balance in both directions, is as follows: Fig. 1 represents the several parts in their respective and relative positions immediately before the balance receives an impulse through the lever pallet $g$. The scape wheel is now locked on the locking plane of that pallet. The balance as it moves in the direction of the arrow 6, causes the pin $i$, to come in contact with the fork $e$, of the lever, thus causing the lever to be moved in the same direction with the pin $i$. This action of the lever causes the pallet $g$, to be moved till the scape wheel tooth is released from its locking plane, when the tooth immediately passes on to the impulse plane of the said pallet, as illustrated in Fig. 2. This figure represents the escapement as it is in the resting or quiescent position to which it is brought by the hair-spring when there is no motive power applied, and also represents the respective and relative positions of the parts when the balance is receiving impulse from the lever. The action of the tooth in passing over the impulse plane of the pallet $g$, forces the fork of the lever against the pin $i$, thus giving the balance impulse in the direction of the arrow 6, until the point of the tooth escapes from the pallet $g$, when the scape wheel is arrested by coming in contact with the pallet $f$, as shown in Fig. 3. The action of the escapement in this direction as above described is precisely the same as that of the common lever escapement. The balance is now left free to continue its movement in the direction of the arrow, until it is arrested by the hair spring, usually moving about two-thirds of a revolution from the unlocking or impulse point, indicated by the dotted position of the roller shown in Fig. 3. After the balance has been thus arrested it is forced back by the hairspring in the direction of the arrow 7 until the pin $i$, comes in contact with the fork, and by its action on the lever causes the detent pallet $f$, to become unlocked from the scape wheel,—at which time the chronometer impulse pallet $j$, on the balance staff has moved around to the proper position to be taken by the advancing tooth of the scape wheel, as shown in Fig. 4, when the said tooth presses against the face of the said pallet until the scape wheel is again arrested by the locking plane of the lever impulse pallet $g$, as shown in Fig. 1, thus giving the impulse in the direction of the arrow 7, in which direction the balance continues to move till arrested by the hair spring, when it again moves in the direction of the arrow 6. The impulse in the direction of the arrow 7, is given in precisely the same manner as in the common chronometer escapement.

The guard pin $k$, of the lever operates in combination with the roller $h'$, in precisely the same manner as in the ordinary lever escapement.

I do not claim broadly the combination of the lever and chronometer escapement, as such a combination is used in the escapement of O. W. Waste, patented September 24th, 1844. But

What I claim as my invention and desire to secure by Letters Patent is:—

So applying the lever in combination with the chronometer escapement that the whole impulse given to the balance in one direction is transmitted through the lever, and the whole impulse in the opposite direction is transmitted directly to the "chronometer impulse pallet," substantially as herein described, locking and unlocking the scape wheel but once at each and every impulse given by said wheel.

GEO. P. REED.

Witnesses:
WM. GASTON,
JOHN BACKUP.